United States Patent
Aoki

(10) Patent No.: US 7,385,996 B2
(45) Date of Patent: Jun. 10, 2008

(54) DATA DISTRIBUTION APPARATUS AND METHOD

(75) Inventor: Keisuke Aoki, Tokyo (JP)

(73) Assignee: Sony Corporation, Tokyo (JP)

( * ) Notice: Subject to any disclaimer, the term of this patent is extended or adjusted under 35 U.S.C. 154(b) by 858 days.

(21) Appl. No.: 10/610,846

(22) Filed: Jul. 1, 2003

(65) Prior Publication Data

US 2004/0008741 A1  Jan. 15, 2004

(30) Foreign Application Priority Data

Jul. 4, 2002 (JP) ............................ P2002-196277

(51) Int. Cl.
*H04L 12/28* (2006.01)
(52) U.S. Cl. ........................................ 370/412; 370/389
(58) Field of Classification Search ................ 370/216, 370/235, 282, 471, 474, 475, 542
See application file for complete search history.

(56) References Cited

U.S. PATENT DOCUMENTS

| 6,181,706 B1* | 1/2001 | Anderson et al. ............ 370/412 |
| 6,359,911 B1* | 3/2002 | Movshovich et al. ........ 370/536 |
| 6,735,634 B1* | 5/2004 | Geagan et al. .............. 709/235 |

* cited by examiner

*Primary Examiner*—Chi Pham
*Assistant Examiner*—Phuc Tran
(74) *Attorney, Agent, or Firm*—Frommer Lawrence & Haug LLP; William S. Frommer; Thomas F. Presson

(57) ABSTRACT

A decoding system (1) is provided in which a memory transfer block (14) stores an input transport stream into a memory (16) and the top address of each TS packet into an address memory (15), a CPU (21) refers to information stored in the address memory (15) to access each packet in a memory (16) and analyze header information in the packet, the CPU (21) generates a transfer instruction to transfer data from the memory (16) to a decoder (19 or 20) for each access unit (one frame, for example) and supplies it to a DMA circuit (17 or 18), and the DMA circuit (17 or 18) reads the data from the memory (16) and transfers it to the decoder (19 or 20) according to the transfer instruction supplied from the CPU (21).

2 Claims, 3 Drawing Sheets they elapses. For example, in a TV conference system or the like over which a plurality of users has a talk with each other,

DATA DISTRIBUTION APPARATUS AND METHOD

BACKGROUND OF THE INVENTION

1. Field of the Invention

The present invention generally relates to the technical field of data distribution, and more particularly to a data distribution apparatus and method, in which an input multiplexed stream formed by multiplexing video data, audio data, etc. on a plurality of channels in units of a packet is demultiplexed according to each channel and each of the demultiplexed data is distributed to a decoder on a corresponding one of the channels.

This application claims the priority of the Japanese Patent Application No. 2002-196277 filed on Jul. 4, 2002, the entirety of which is incorporated by reference herein.

2. Description of the Related Art

For distribution of digital contents over a network, a plurality of elementary streams such as video data, audio data, text data, program data and other system data necessary for transmission, supplied from a plurality of data encoders, is multiplexed at the sending side. The distributed multiplexed stream is demultiplexed by a demultiplexer at the receiving side into a plurality of elementary streams each of which is distributed to a decoder on a corresponding channel.

For demultiplexing a multiplexed stream into a plurality of elementary streams, the conventional demultiplexer analyzes the number of elementary stream channels included in the multiplexed stream, and pre-divides a memory area for data on each of the channels. Then, the demultiplexer stores an input packet into a a divisional memory area for data on a corresponding channel. The division of the memory area for each of the channels is effected in a first session done after the multiplexed stream is supplied.

In some cases, however, the number of channels of data included in a multiplexed stream varies dynamically as the time elapses. For example, in a TV conference system or the like over which a plurality of users has a talk with each other, when an additional user participates in the conference or any of the participants leaves the conference, the number of channels will vary dynamically. When the number of channels varies dynamically, division of the memory area by a number of channels determined at the start of a session will lead to an insufficient number of channel areas formed in the memory or result in an unused memory area in the course of data transfer.

Also, the packet distribution in which it is judged to which channel an input packet corresponds and the input packet is stored into a corresponding memory area has to be done on the real-time basis. Also, the amount of processing in the packet distribution is large. Therefore, if a main controller used by other circuits as well is let to make the packet distribution in addition, the burden to the main controller will be increased since the packet distribution has to be done on the real-time basis. Further, even if a hardware is provided independently of the main controller to effect the packet distribution, the circuit scale will be larger since the amount of processing is large.

OBJECT AND SUMMARY OF THE INVENTION

It is therefore an object of the present invention to overcome the above-mentioned drawbacks of the related art by providing a data distribution apparatus and method, capable of utilizing th memory area efficiently even in case the number of channels varies dynamically.

The above object can be attained by providing a data distribution apparatus which demultiplexes an input multiplexed stream formed by multiplexing data streams on a plurality of channels in units of a packet according to each channel and distributes each of the demultiplexed data stream to a data processor on a corresponding one of the channels, the apparatus including, according to the present invention, a controller; a memory which stores the input multiplexed stream; an address information generating means for generating, for each packet, address information indicative of a location where the multiplexed stream is stored in the memory; address information storage means for storing the address information; and a data transfer means for reading data from the memory and transferring the data to the data processor according an instruction given by the controller; the controller referring to the address information stored in the address information storage means to access each packet on each channel, referring to header information in each packet to determine a storage location, in the memory, which is a decoding unit of data stream on each channel, generating a transfer instruction to read data from the memory in units of the decoding unit and transfer the data to the data processor on a corresponding channel, and supplying the transfer instruction to the data processor.

Also, the above object can be attained by providing a data distribution method in which each data stream included in an input multiplexed stream formed by multiplexing data streams on a plurality of channels in units of a packet according to each channel is distributed to a data processor on a corresponding one of the channels, the method including, according to the present invention, the steps of storing the input multiplexed stream; generating, for each packet, address information indicative of a location where the multiplexed stream is stored in the memory and storing it into an address information memory provided to store the address information; accessing each packet in the memory according to the address information stored in the address memory, referring to header information in each packet to determine a storage location, in the memory, which is a decoding unit of data stream on each channel, generating a transfer instruction to read data from the memory in units of the decoding unit and transfer the data to the data processor on a corresponding channel; supplying the transfer instruction to a data transfer means which transfers data from the memory to the data processor; and reading, by the data transfer means, data from the memory and transferring the data to the data processor according to the supplied transfer instruction.

In the above data distribution apparatus and method, the following processes are done:

The address information indicative of a storage location, in the memory, of the input multiplexed stream is generated for each packet, and stored in the address memory provided to store the address information. The controller accesses each packet in the memory on the basis of the address information stored in the address memory, and determines, for each channel, the storage location of data being a minimum unit of decoding required for decoding with reference to header information in each packet. The controller reads data from the memory for each decoding unit and generates a transfer instruction for transfer of data to a data processor on a corresponding channel. Then, the data transfer means reads data from the memory and transfers the data to the data processor according to the received transfer instruction.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The decoding system will be described as an embodiment of the present invention with reference to the accompanying drawings.

Figure 1:
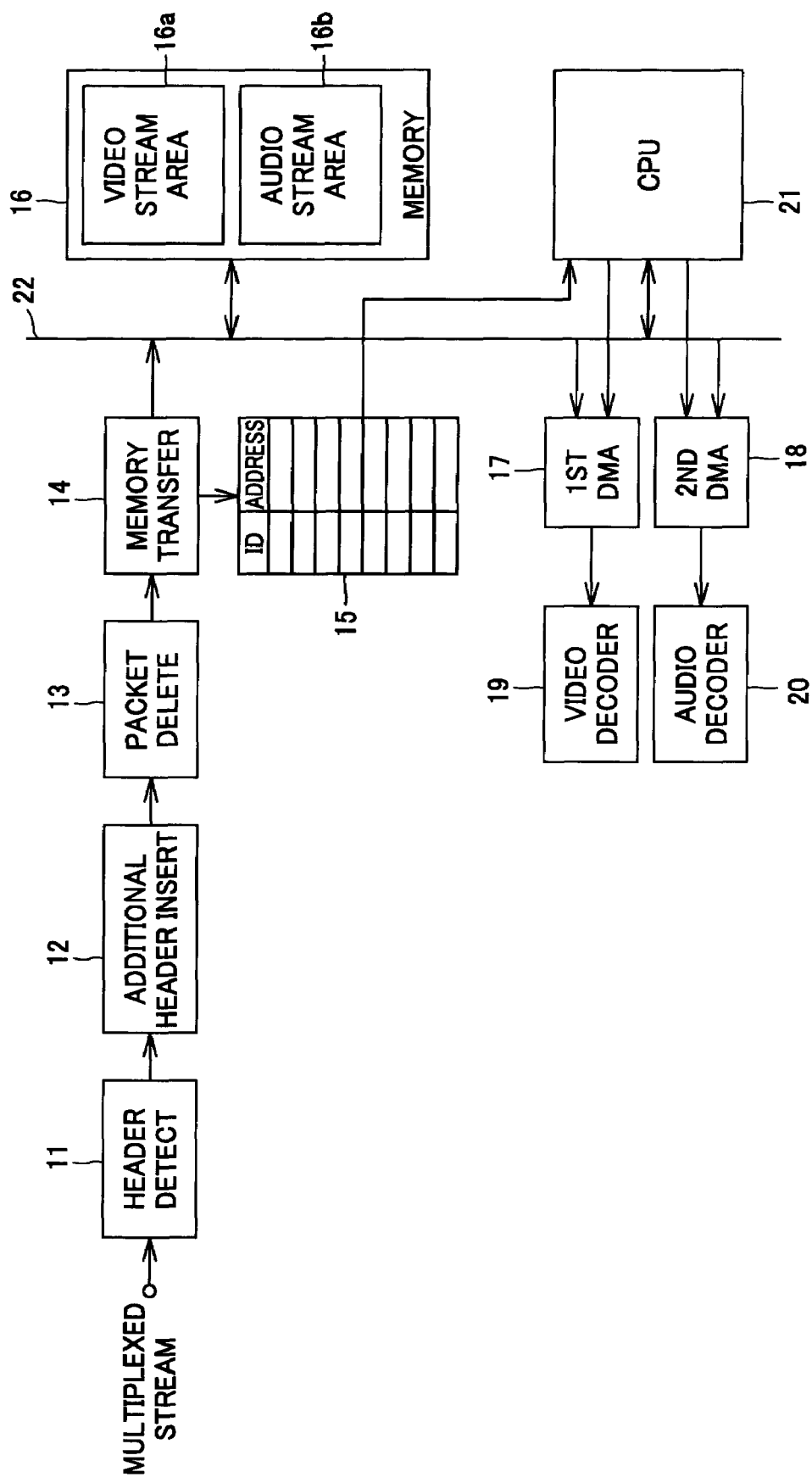
FIG. 1 is a block diagram of an embodiment of the decoding system according to the present invention.

Referring now to FIG. 1, the decoding system according to the present invention is schematically illustrated in the form of a block diagram. The decoding system is generally indicated with a reference 1.

As shown in FIG. 1, the decoding system 1 according to the present invention includes a header detector 11, additional-header insert block 12, packet delete block 13, memory transfer block 14, address information storage block 15, memory 16, first DMA (direct memory access) circuit 17, second DMA circuit 18, video decoder 19, audio decoder 20 and a CPU (central processing unit) 21.

As shown, the decoding system 1 is supplied with a multiplexed stream formed by multiplexing coded data on a plurality of channels from outside via a network. The input multiplexed stream is a one in which coded data on various channels, packetized according to a predetermined transmission standard, are multiplexed in units of a packet. For example, the decoding system 1 is supplied with a transport stream (TS) defined in MPEG-2 Systems, RTP (real-time transport protocol RFC 1889) which is a technical standard for real-time distribution of audio and video data over an IP network, elementary stream ES defined in MPEG-2 or -4, program stream (PS), etc. as the multiplexed stream.

Note that in this embodiment, the "channel" is defined as a transmission path corresponding to each of coded streams which are to be multiplexed. For example, even in case audio data and video data, to be reproduced at the same time, are sent from one distribution source, the audio and video data shall be transmitted on different channels.

The header detector 11 is internally supplied with multiplexed streams. It detects the header of a packet included in the input multiplexed stream. The "packet" referred to herein corresponds to a multiplexed unit in the input multiplexed stream. For example, the packet corresponds to a TS packet in TS, RTP packet in RTP, pack in PS, and AU (access unit) in ES.

The additional-header insert block 12 is provided to place a header before a header in each packet detected by the header detector 11. An additional header has described therein a start code for the additional header, packet ID code, time when the packet has been entered, and packet information such as number of packets and bytes.

Figure 2:
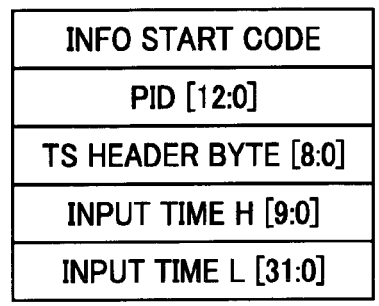
FIG. 2 explains an additional header to be inserted when TS is supplied.

Contents of the description of an additional header inserted by the additional-header insert block 12 will be described below with reference to FIGS. 2, 3 and 4. FIG. 2 shows an additional header to be inserted into TS, when the latter is supplied to the decoding system 1. The additional header for TS has described therein data including TS packet information, such as INFO_START_CODE, PID, TS_HEADER_BYTE, INPUT_TIME_H and INPUT_TIME_L. INFO_START_CODE indicates the start position of the additional header. PID identifies a TS packet following the additional header. TS_HEADER_BYTE indicates a number of bytes in a header of the TS packet, following the additional header. INPUT_TIME_H and INPUT_TIME_L indicate a time when the TS packet has been entered.

Figure 3:
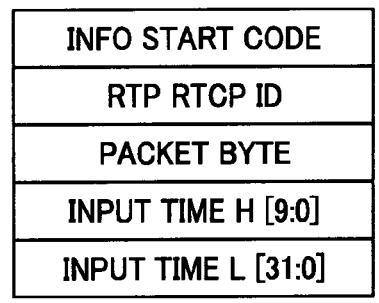
FIG. 3 explains an additional header to be inserted when RTP is supplied.

FIG. 3 shows an additional header to be inserted into RTP, when the latter is supplied to the decoding system 1. The additional header for RTP has described therein data including RTP packet information, such as INFO_START_CODE, RTP_RTCP_ID, PACKET_BYTE, INPUT_TIME_H and INPUT_TIME_L. INFO_START_CODE indicates the start position of the additional header. RTP_RTCP_ID identifies RTP and RTCP following the additional header. PACKET_BYTE indicates a number of bytes in an RTP packet following the additional header. INPUT_TIME_H and INPUT_TIME_L indicate a time when the RTP packet has been entered.

Figure 4:
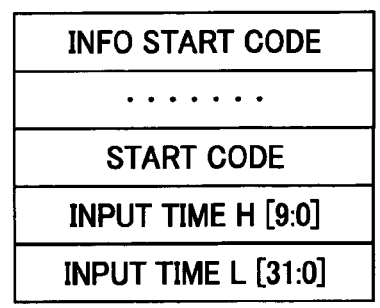
FIG. 4 explains an additional header to be inserted when ES or PS is supplied.

FIG. 4 shows a header to be inserted into ES or PS, when the latter is supplied to the decoding system 1. The additional header for ES or PS has described therein data including PS packet information, such as INFO_START_CODE, START_CODE, INPUT_TIME_H and INPUT_TIME_L. INFO_START_CODE indicates the start position of the additional header. START_CODE indicates the start position of a sequence following the additional header. INPUT_TIME_H and INPUT_TIME_L indicate a time when the packet has been entered. An additional header to be placed at the beginning of AU of ES has not to have INPUT_TIME_H and INPUT_TIME_L described therein.

The packet delete block 13 is provided to delete an unnecessary packet, not to be decoded, of packets included in the input multiplexed stream. When deleting a packet, the packet delete block 13 will delete an additional header inserted in that packet.

The memory transfer block 14 is supplied with a multiplexed stream having an additional header inserted therein and from which an unnecessary packet has been deleted by the packet delete block 13. The memory transfer block 14 stores the input multiplexed stream in units of a packet into the memory 16. When storing the packet, the memory transfer block 14 will also store the additional header placed at the beginning of the packet. In case the input packet includes video data, the memory transfer block 14 stores the packet into a video stream storage area 16a of the memory 16. On the other hand, in case the input packet includes audio data, the memory transfer block 14 stores the packet into an audio stream storage area 16b of the memory 16. It should be noted that when storing packets, the memory transfer block 14 will store one packet in successive areas.

Also, the memory transfer block 14 generates packet address indicative of the top address of each packet stored in the memory 16, that is, the top address of the additional header, and information for identification of the packet (PID and RTP_RTCP_ID, for example) and stores it into the address information storage block 15. The packet address information is generated for all packets stored in the memory 16.

The memory 16 stores the input multiplexed stream. It is accessed by the memory transfer block 14, first DMA circuit 17, second DMA circuit 18 and CPU 21 via a memory bus 22. It should be noted that in this embodiment, the memory 16 has a video stream area 16a and audio stream area 16b formed therein. The video stream area 16a stores video data included in the multiplexed stream, while the audio stream area 16b stores audio data not included in the multiplexed stream. However, data may be stored over these video and audio stream areas, namely, data may be stored in the memory 16 without distinction between data types.

The first DMA circuit 17 is supplied from an instruction from the CPU 21, and reads data from the memory 16 according to the instruction and transfers the data to the video decoder 19.

The second DMA circuit 18 is supplied with an instruction from the CPU 21. It reads data from the memory 16 according to the instruction and transfers the data to the audio decoder 20.

The video decoder 19 decodes coded data which is to be transferred via the first DMA circuit 17 to provide baseband video signal.

The audio decoder 20 decodes coded data which is to be transferred via the second DMA circuit 18 to provide baseband audio signal.

The CPU 21 controls the entire decoder system 1. Also, the CPU 21 can read the packet address information directly from the address information storage block 15.

Next, the data distribution method of distributing the multiplexed stream stored in the memory 16 to the video and audio decoders 19 and 20.

In the decoding system 1, the input multiplexed stream is recorded to the memory 16. In this decoding system 1, packet address information is generated for all packets stored to the memory 16 in the decoding system 1 and the packet address information is recorded to the address information storage block 15. The packet address information indicates the top address of each packet.

The CPU 21 first reads the packet address information from the address information storage block 15. It accesses an address, in the memory 16, indicated by the read packet address information, and reads the packet header information.

Next, the CPU 21 analyzes the read header information to analyze the access unit. The "access unit" is a minimum decoding unit in decoding the data stream. For example, one access unit of video data is normally one frame. The access unit analysis is made for data on all channels, included in the multiplexed stream.

Then, the CPU 21 generates a transfer instruction for transfer of data in the access unit from the memory 16 to the video decoder 19 or audio decoder 20.

Further, the CPU 21 sends the transfer instruction for transferring the access unit to a corresponding one of the DMA circuits in a timing of executing the access unit, that is, in a timing of decoding the access unit. For example, in a timing of decoding video data, if applied, the CPU 21 will supply the transfer instruction to the first DMA circuit 17. On the other hand, in a timing of decoding audio data, if applied, the CPU 21 will send the transfer instruction to the second DMA circuit 18.

When supplied with the transfer instruction from the CPU 21, the DMA circuits 17 and 18 read data from an address, in the memory 16, described in the transfer instruction, and send the data to a corresponding one of the video and audio decoders 19 and 20.

Figure 5:
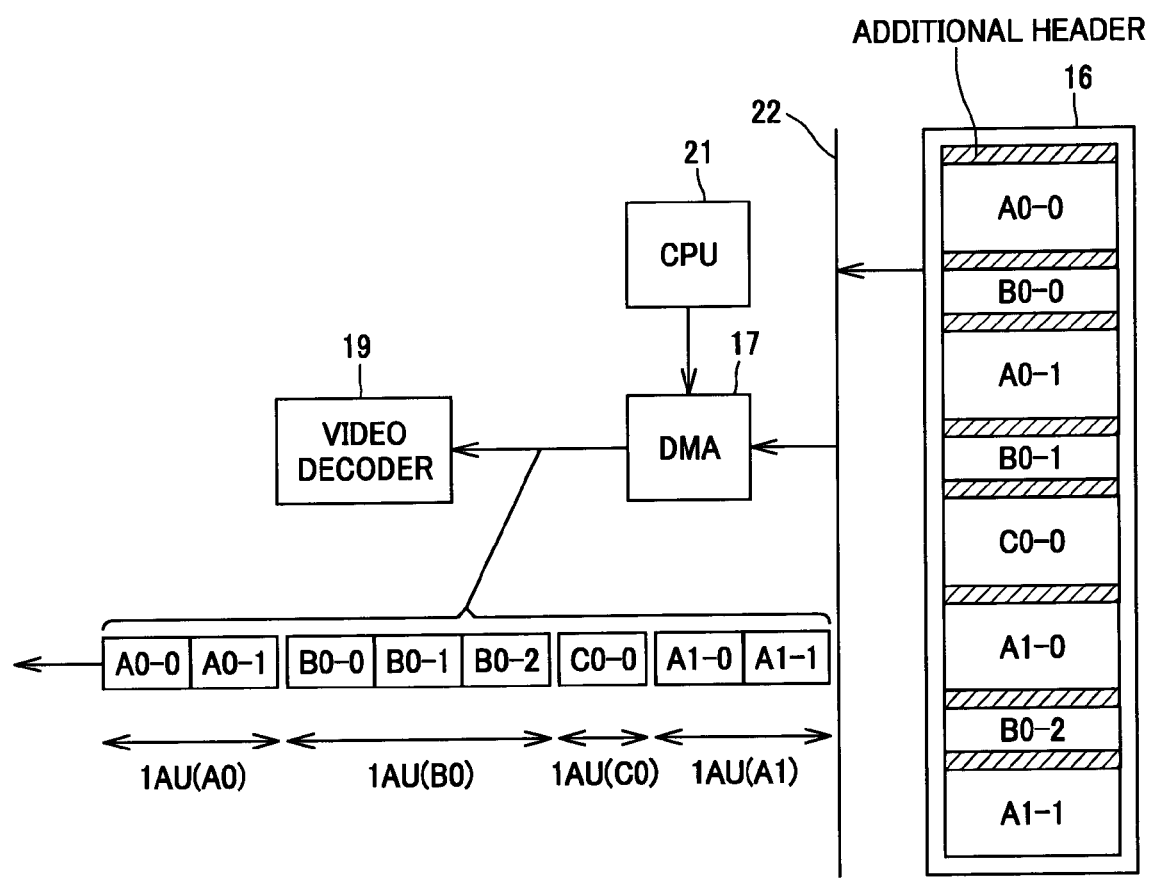
FIG. 5 explains multiplexed data to be transferred to the decoder in units of AU.

For example, it is assumed that the multiplexed stream includes video data on three channels A, B and C, for example, as shown in FIG. 5. The memory 16 stores data in the input order of packets whether the data are on any of the channels A, B and C.

It is assumed here that one access unit A0 is formed from payload data of two packets A0-0 and A0-1 on the channel A. In this case, the CPU 21 will generate a transfer instruction for transfer of the payload data of the packet A0-0 and then of the payload data of the packet A0-1 to the video decoder 19. That is to say, the CPU 21 generates a transfer instruction designating the top address and number of bytes of the payload data of each of the packets A0-0 and A0-1. In a timing of decoding the access unit A0, the CPU 21 supplies the first DMA circuit 17 with the generated transfer instruction. Then, the first DMA circuit 17 will read the payload data of the packets A0-0 and A0-1 in succession and supplies the data to the video decoder 19.

Also, it is assumed that one access unit B0 is formed from payload data of three packets B0-0, B0-1 and B0-2 on the channel B and decoded in a timing next to the access unit A0. In this case, the CPU 21 generates a transfer instruction for transfer of the payload data of the packets B0-0, B0-1 and B0-2 in succession to the video decoder 19. That is, the CPU 21 will generate a transfer instruction designating top address and number of bytes of the payload data of each of the packets B0-0, B0-1 and B0-2. In a timing of decoding the access unit B0, the CPU 21 supplies the generated transfer instruction to the first DMA circuit 17. Then, the first DMA circuit 17 will read the payload data of the packets B0-0, B0-1 and B0-2 in succession and supplies the data to the video decoder 19.

Note that although the CPU 21 transfers the generated transfer instruction to the DMA circuits 17 and 18 in a timing of executing the access unit, the execution timing, namely, a time at which the access unit is decoded, may be described in the transfer instruction and supplied to a corresponding one of the DMA circuits 17 and 18. In this case, the DMA circuit 17 or 18 stores the supplied transfer instruction in a queue once and executes the transfer instructions stored in the queue when the execution time is reached. In this case, the CPU 21 may supply the transfer instruction to the DMA circuit 17 or 18 at an arbitrary time (at least before the timing of decoding).

In the decoding system 1 having been described in the foregoing, the packet address indication indicating the storage location, in the memory 16, of the input multiplexed stream is generated packet by packet and stored in the address information storage block 15. The CPU 21 accesses each packet in the memory 16 according to the packet address information stored in the address information storage block 15 and refers to the header information in each packet to analyze the necessary minimum decoding unit for decoding the data. The CPU 21 generates a transfer instruction to read data from the memory 16 for each access unit and transfer it to a corresponding one of the DMA circuits 17 and 18. The DMA circuit 17 or 18 reads data from the memory 16 and transfers it to the decoder 19 or 20 according to the transfer instruction supplied from the CPU 21.

Thus, in the decoding system 1, it is unnecessary to divide the area in the memory 16 for each channel, and so the area of the memory 16 can efficiently be utilized even if the number of channels varies dynamically.

Also, in the decoding system 1 according to the present invention, since the CPU 21 accesses data stored in the memory 16, so it is not necessary to process any input multiplexed stream on the real-time basis. Thus, the burden to the CPU 21 is smaller and the CPU 21 can be correspondingly available to other resources. Also, in this decoding system 1, since a circuit having to process the input multiplexed stream on the real-time basis has only to calculate the storage location of each packet in the memory 16, its burden is smaller. Thus, the scale of any circuit provided separately from the CPU 21 can be reduced.

The data distribution apparatus and method according to the present invention provide the following operations:

Packet address indication indicating the storage location, in a memory, of an input multiplexed stream is generated for each packet and stored in an address memory. A controller accesses each packet in the address memory according to the packet address information stored in the address memory and refers to the header information in each packet to analyze a necessary minimum decoding unit for decoding data. The controller generates a transfer instruction to read data for each decoding unit and transfer it to a data processor on a corresponding channel. A data transfer means reads data from the memory and transfers it to the data processor according to the transfer instruction supplied from the controller.

Thus, in the data distribution apparatus and method, it is unnecessary to divide the area in the memory for each channel, and so the area of the memory can efficiently be utilized even if the number of channels varies dynamically.

Also, in the data distribution apparatus and method according to the present invention, since the controller accesses data stored in the memory, so it is not necessary to process any input multiplexed stream on the real-time basis. Thus, the burden to the controller is smaller and the controller can be correspondingly available to other resources. Also, in this data distribution apparatus and method, since a circuit having to process the input multiplexed stream on the real-time basis has only to calculate the storage location of each packet in the memory its burden is smaller. Thus, the scale of any circuit provided separately from the controller can be reduced.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

What is claimed is:

1. A data distribution apparatus which demultiplexes an input multiplexed stream formed by multiplexing data streams on a plurality of channels in units of a packet according to each channel and distributes each of the demultiplexed data stream to a data processor on a corresponding one of the channels, the apparatus comprising:

a controller;

a memory which stores the input multiplexed stream;

address information generating means for generating, for each packet, address information indicative of a location where the multiplexed stream is stored in the memory;

address information storage means for storing the address information; and data transfer means for reading data from the memory and transferring the data to the data processor according an instruction given by the controller;

wherein the controller refers to the address information stored in the address information storage means to access each packet on each channel, referring to header information in each packet to determine a storage location, in the memory, which is a decoding unit of data stream on each channel, wherein the controller analyzes a minimum necessary decoding unit that is to be decoded, generates a transfer instruction to read data from the memory in units of the decoding unit in succession, and transfers the data to the data processor on a corresponding channel, and supplies the transfer instruction to the data processor.

2. A data distribution method in which each data stream included in an input multiplexed stream formed by multiplexing data streams on a plurality of channels in units of a packet according to each channel is distributed to a data processor on a corresponding one of the channels, the method comprising the steps of:

storing the input multiplexed stream;

generating, for each packet, address information indicative of a location where the multiplexed stream is stored and storing the packet into an address information memory provided to store the address information;

accessing each packet in the memory according to the address information stored in the address memory;

referring to header information in each packet to determine a storage location, in the memory, which is a decoding unit of data stream on each channel;

analyzing a minimum necessary decoding unit that is to be decoded;

generating a transfer instruction to read data from the memory in units of the decoding unit in succession and transfer the data to the data processor on a corresponding channel;

supplying the transfer instruction to a data transfer means which transfers data from the memory to the data processor; and reading, by the data transfer means, data from the memory and transferring the data to the data processor according to the supplied transfer instruction.

* * * * *